(12) United States Patent
Neeff

(10) Patent No.: US 6,667,876 B1
(45) Date of Patent: Dec. 23, 2003

(54) WIRING TRACK HAVING AN INTERNAL WIRING CAVITY AND PROVIDING FOR THE MOUNTING OF A DIN RAIL THEREON

(76) Inventor: Harry B. Neeff, P.O. Box 50728, Casper, WY (US) 82605-0728

( * ) Notice: Subject to any disclaimer, the term of this patent is extended or adjusted under 35 U.S.C. 154(b) by 0 days.

(21) Appl. No.: 10/206,694

(22) Filed: Jul. 26, 2002

(51) Int. Cl.[7] ............................................... H02G 3/04
(52) U.S. Cl. ...................... 361/601; 361/611; 174/48; 174/97; 439/114; 439/209
(58) Field of Search .................. 361/601, 611, 361/622; 174/48, 49, 60, 67, 68.3, 95, 99 R, 69, 100, 135, 72 A, 72 R, 136, 97, 72 C, 99, 101; 202/3.2, 3.8, 3.3, 4.01, 4.02, 340, 341; 52/287.1, 220.7, 220.3, 220.5, 220.1, 220.8; 16/267, 374; 439/113, 114, 209, 215, 216, 519, 892, 410, 154, 521, 934, 137–140, 145, 93

(56) References Cited

U.S. PATENT DOCUMENTS

| | | | |
|---|---|---|---|
| 3,821,688 A | 6/1974 | Larsile | 339/22 R |
| 4,032,209 A | 6/1977 | Rutkowski | 339/91 R |
| 4,710,853 A | 12/1987 | Reinhardt | 361/391 |
| RE32,899 E | 4/1989 | Laidman | 362/226 |
| 4,827,372 A | 5/1989 | Day | 361/331 |
| 5,024,614 A * | 6/1991 | Dola et al. | 439/114 |
| 5,162,614 A | 11/1992 | Bogiel et al. | 174/97 |
| 5,203,711 A * | 4/1993 | Bogiel | 439/215 |
| 5,784,841 A * | 7/1998 | Nowell | 52/220.5 |
| 5,942,724 A | 8/1999 | Russo et al. | 174/48 |
| 5,942,729 A * | 8/1999 | Carlson et al. | 174/68.1 |
| 6,315,580 B1 | 11/2001 | Hurtubise et al. | 439/82 |
| 6,350,135 B1 | 2/2002 | Acklin et al. | 439/211 |
| 6,437,244 B1 * | 8/2002 | Vander Velde | 174/68.3 |
| 6,459,038 B1 * | 10/2002 | Waszak et al. | 174/48 |
| 6,483,027 B1 * | 11/2002 | Howard et al. | 174/48 |

* cited by examiner

*Primary Examiner*—Michael Datskovsky
(74) *Attorney, Agent, or Firm*—Holland & Hart LLP; Francis A. Sirr, Esq.

(57) ABSTRACT

An elongated and hollow wiring track includes a rectangular plastic cover whose edges carry female hinge members and a U-shaped plastic channel having a flat outer surface, two inclined side walls that extend in a common direction at 45-degrees away from the flat outer surface, and two perpendicular side walls that extend in a common direction away from the inclined side walls perpendicular to the flat outer surface. Each of the perpendicular side walls carries a male hinge member that releasably mates with a female hinge member when the U-shaped channel is pivotally mounted onto the cover to form an internal wire-cavity. A DIN rail mounted on the outer surface of the U-shaped channel. A terminal strip is mounted on an exterior surface of each of the inclined side walls. The number N of metal busses are mounted on each of the terminal strips. A plurality of terminal-groups are mounted on each of the terminal strips. Each terminal-group has the number N of electrical connectors individually connected to different ones of the number N of metal busses. A plurality of wire-openings are formed in the U-shaped channel; and a plurality of wire-openings are formed in the flat outer surface of the U-shaped channel. A pair of plastic end plates closing opposite ends of the internal wire-cavity, and at least one of the end plates includes wire-openings.

31 Claims, 4 Drawing Sheets

WIRING TRACK HAVING AN INTERNAL WIRING CAVITY AND PROVIDING FOR THE MOUNTING OF A DIN RAIL THEREON

FIELD OF THE INVENTION

This invention relates to the field of electrical systems and devices, and more specifically a surface-mounted track, conduit, raceway or duct having diverse components that facilitate the mounting of electrical devices onto the track/conduit/raceway/duct, and which provides for the routing of wiring that extends to and from the electrical devices.

BACKGROUND OF THE INVENTION

A non-limiting utility of the present invention is to provide a wiring track that is used to route wires to and from electrical/electronic devices that are associated with a control panel, wherein the electrical/electronic devices are designed to control the running and the sequencing of motors that drive pumps and conveyors, and/or to control other electrical/electronic devices such as lamps, etc., at least some of which are controlled by level, pressure, temperature, and/or flow sensors or switches.

Many times in the past relays and control equipment were mounted directly on a control panel, and the associated wiring was merely bundled together and then tied with a bee's wax impregnated cord.

Other times, a well known DIN rail of variable length was provided, and electrical/electronic components were snapped onto the DIN rail. At the present time, most electrical/electronic components, such as power supplies analog relays, logic controllers and converters, can be purchased with DIN rail mounting means.

When DIN rails were used, it was conventional to also provide a wiring duct that extended around the perimeter of the DIN rail, in order to accommodate wiring to and from the components that were mounted on the DIN rail. The physical space that was occupied by the DIN rail and its surrounding wiring duct was generally quite large, for example this space was often from about 8 to about 12 inches wide.

The present invention provides a new and unusual wiring track that occupies a relatively small physical space, that provides for the mounting of DIN-rail-compatible components and accessories thereon, and that provides for the housing therein of the wiring that is associated with the DIN-rail-compatible components.

Various wiring tracks are known in the art. The following examples are incorporated herein by reference.

U.S. Pat. No. 6,350,135 provides an elongated raceway 30 that includes a divider wall 36 that operates to divide the raceway into two parallel channels. i.e. a communications channel 38 and a power channel 37. A power outlet 10 is mounted over raceway 30 (see FIGS. 7–11) such that its terminal interface arm 20 that carries a neutral contact 14, a ground contact 16 and hot contacts 18 reside within power channel 37, for connection to power wires 40.

U.S. Pat. No. 3,821,688 provides a multi-purpose wall service duct that includes a molding 1 having three parallel channels that carry wires or pipes. The three channels of the service duct include a top cover 18, and middle cover 6 and a lower cover 27. FIG. 1 shows how a distribution connector 12, and TV power outlet 23 and a special connector 32 can be mounted on the middle cover 6 for connection to electrical conductors that are carried by the three parallel channels of the service duct.

U.S. Pat. No. 5,942,724 provides a raceway for power wiring 14 and communications wiring 16. A raceway base 10 includes a divider 18 that provides two parallel channels, one channel for each type of wiring. An electrical outlet back plate 20 can be provided over base 10 as shown in FIG. 5, and cover segments 12 can be provided over base 10 between the outlet back plates, to thus provide the arrangement shown in FIG. 4 that includes the double gang back plate 60 shown in FIG. 6, wherein back plate 60 includes both power leads 14 and data communications wires 16, and facilitates connection to a vertically extending raceway 100.

U.S. Pat. No. 5,784,841 provides a hollow structure (B of FIG. 2, C of FIG. 6, or D of FIG. 8) that can internally support the electrical raceway that is shown in FIG. 1.

U.S. Pat. No. 5,162,614 provides a raceway 10 that includes two elongated and U-shaped sections 30 and 32 that are hinged at 34. In an open condition, electrical components such as connectors 14 and 15, power lines, and communications cables are positioned within the raceway sections, whereupon the sections are pivoted to a closed position. The raceway carries both power receptacles 26 and telecommunications receptacles 27.

U.S. Pat. No. 4,032,209 provides an elongated, aluminum or plastic, and U-shaped track 10 having openings 21 cut therein for the passage of wires 39, and having a plurality of stations A, B, etc. that are located along the length of track 10. Each station includes a pair of spring metal clips 45 into which single wiring connector units 11 and their single electrical components 13, or multiple wiring connector units 12 and their multiple electric components 14, are inserted. Components 13 and 14 can be relays, amplifiers, bussing modules, suppressors for voltage transients, etc.

U.S. Pat. No. 6,315,580 provides an electrical connector module 500 wherein electrical connections are automatically made to overcurrent protection devices 400 as the devices are inserted into connector module 500. Module 500 includes a printed circuit board 510 having two male-plug passageways 520,525 and one signal terminal passageway 530 for each signal terminal of an overcurrent protection device 400. Module 500 also includes a number of load busbars 540 and a common support member 550 that functions as a common busbar.

U.S. Pat. No. 4,827,372 provides an assembly for mounting electrical or pneumatic devices 12, 14, 16, 18 on a printed circuit board 10. Printed circuit board 10 is mounted on the side-walls 32 and 34 of a channel 28. A cover channel 44 is provided.

U.S. Pat. No. 4,710,853 provides an assembly for supporting electrical components having snap-action mounts. An extruded housing 1 includes two parallel side walls 3 and 4 and a bottom wall 2. Bottom wall 2 includes two parallel rails 5 to which electrical elements are snap-fastened.

SUMMARY OF THE INVENTION

The invention provides an elongated and flat (plastic) cover having an exposed outer surface that is adapted to be flush-mounted onto a control panel, or on a self that is within a control panel or another type of enclosure, for example a control panel or enclosure that is designed to control the running and the sequencing of motors that drive pumps, blowers or conveyers, lamps and the like in accordance with the output of level, pressure, temperature and flow sensors and/or switches and the like.

In accordance with the invention, each of the two parallel side edges of the above-mentioned cover include the female-portion of a snap-in hinge.

An elongated and generally U-shaped (plastic) channel is formed by (1) a flat and rectangular-shaped top-wall, (2) two rectangular-shaped angle-walls that respectively extend downward at an angle (of about 45-degrees) from the two parallel edges of the top-wall, and (3) two rectangular-shaped and parallel side-walls that respectively extend downward from an edge of the two angle-walls so as to extend generally perpendicular to the top-wall.

The free end of each of the two above-mentioned side walls includes the male-portion of a snap-in hinge.

The U-shaped channel is mounted onto the cover when one or both of its male hinge portions are snapped into one or both of the cover's female hinge portions.

The cover and U-shaped channel may be cut to any required length.

The top and exposed surface of the U-shaped channel includes a metal mounting rail (more specifically a well known DIN rail) to which electrical/electronic devices such as terminals, relays, power supplies, etc. are mechanically mounted. This DIN rail may also function as a grounding bus for the components that are mounted thereon.

The top-wall and the two side-walls of the U-shaped channel include elongated through-openings (more specifically elongated slots). The internal and elongated cavity that is defined by the cover and the U-shaped channel provides for the routing of electrical wires that extend to and from the electrical devices that are mounted onto the DIN rail.

The exposed and sloped surface of each of the two angle-walls includes an elongated slot. Each slot slidably receives or mounts the two opposite edges of an elongated and generally rectangular printed circuit board (PCB). Each PCB carries four elongated and parallel metal busses.

More specifically, (1) a first metal bus lies on the top surface of the PCB and extends along one edge of the PCB, (2) a second metal bus lies on the bottom surface of the PCB and extends along the one edge of the PCB, (3) a third metal bus lies on the top surface of the PCB and extends along an opposite edge of the PCB, and (4) a fourth metal bus lies on the bottom surface of the PCB and extends along the opposite edge of the PCB.

The top, exposed, and elongated middle-surface of each PCB mounts a plurality of screw-terminal-groups that collectively extend the length of the PCB. Each screw-terminal-group includes four individual screw-connectors that are grouped together in a side-by-side arrangement.

The first screw-connector of each terminal-group is printed-circuit-connected to a first of the PCB's four metal busses. The second screw-connector of each terminal-group is printed-circuit-connected to a second of the PCB's four metal busses. The third screw-connector of each terminal-group is printed-circuit-connected to a third of the PCB's four metal busses. The fourth screw-connector of each terminal-group is printed-circuit-connected to a fourth of the PCB's four metal busses.

Virtually any desired power and/or input/output wiring configuration can be provided to and from electrical devices that reside on the DIN rail by way of electrical connection to the various terminal-groups that extend the length of the PCB.

A given wire may enter and/or leave the longitudinally-extending and internal cavity that extends the length of the wiring track by way of the above-mentioned elongated openings, the wire passes then down at least a portion of the length of the cavity, the wire then exits the cavity by way of an elongated opening, whereupon the wire may be connected to a desired screw-connector and its metal bus.

In this way, a desired electrical connection can be made to any device that is mounted on the DIN rail, electrical signals can be applied to any device that is mounted on the DIN rail, and/or electrical signals can be taken off of any device that is mounted on the DIN rail.

Two end plates can be provided to close the two opposite ends of the internal cavity. These end plates preferably include through-holes for the passage of wire through the end plates.

By virtue of the above construction and arrangement, access is provided to the wiring track's internal cavity, the U-shaped channel can be pivoted about either edge of the cover, and the various access openings within the channel and its end plates enable wires to be threaded as is needed.

[LEAVE THIS PARAGRAPH IN? The foregoing and other features, utilities and advantages of the invention will be apparent from the following more particular description of a preferred embodiment of the invention as illustrated in the accompanying drawings.]

DETAILED DESCRIPTION OF THE PREFERRED EMBODIMENT

The present invention provides a multi-piece, plastic, hollow, and elongated wiring track that occupies a relatively small physical space.

The wiring track provides (1) a DIN rail that facilitates the mounting of DIN-rail-compatible components and accessories on the wiring track, (2) an internal and elongated wiring-cavity through which wires can be threaded, (3) a plurality of busses and associated terminals along the length of the wiring track to which wires can be connected, and (4) a plurality of through-holes spaced along the length of the wiring track through which wires can be threaded, such that wire-connections of virtually any type can be made to and from the DIN-rail-compatible components.

Figure 1:
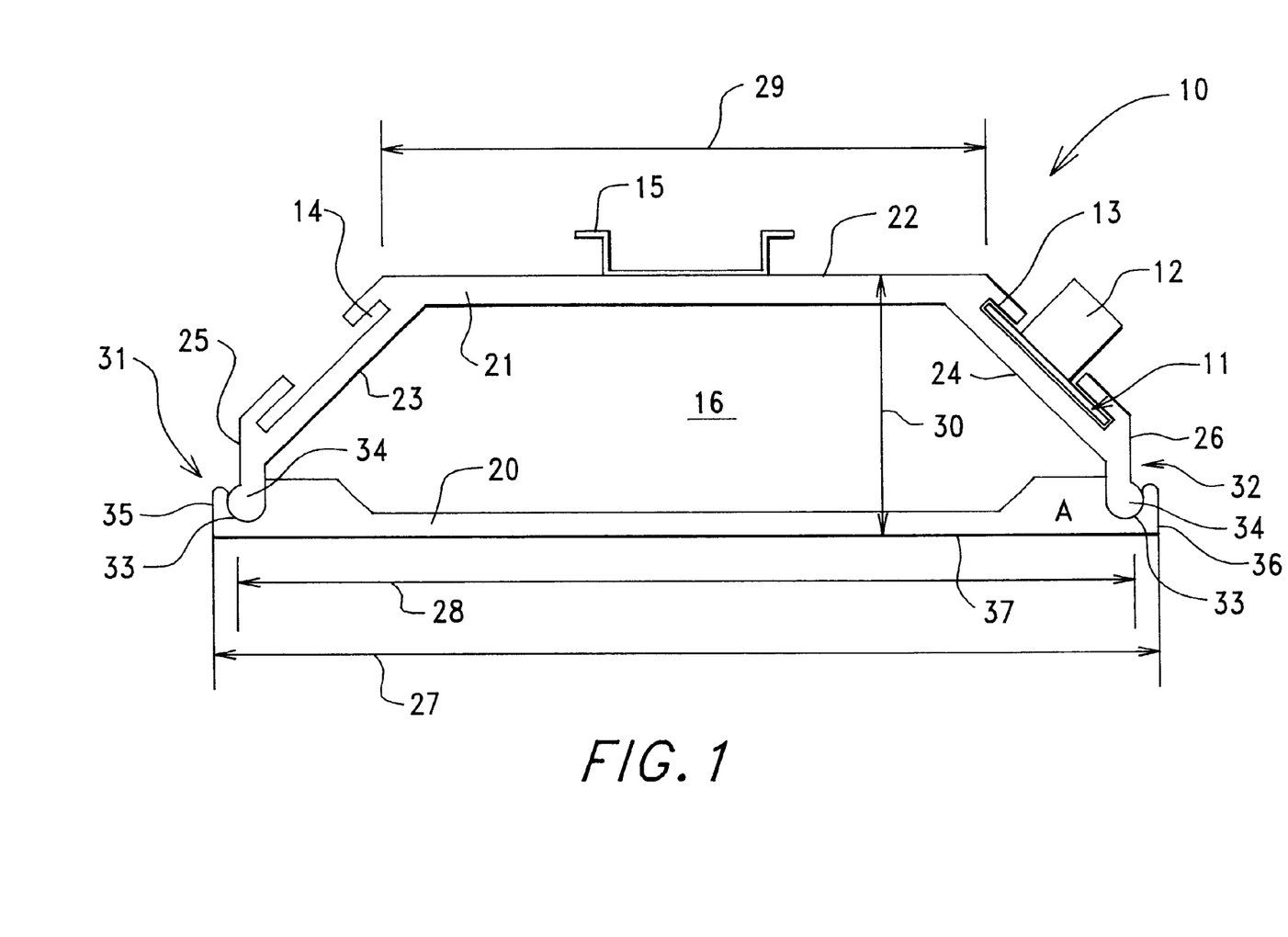
FIG. 1 is an end view of a plastic wiring conduit/duct/track in accordance with the invention, this view showing a printed circuit board and its screw-connectors slidably located within only the right-side slot of the wiring track, with the left-side slot being empty and ready to receive a similar printed circuit board, this view showing the end view of a DIN rail on which electrical components of virtually any type can be mounted, and this view showing an end view of an internal cavity adapted to contain wiring.

FIG. 1 is an end view of a plastic wiring track 10 in accordance with the invention. The basic components of wiring track 10 are a plastic cover 20 and a plastic U-shaped channel 21. In operation, cover 20 and U-shaped channel 21 are relatively long members that are cut to the same common length, as is needed for any given installation.

The external surface of wiring track 10 includes two strip-like printed circuit boards 11 (only one of which is shown in FIG. 1) upon which a plurality of screwdriver-operable electrical connectors 12 are mounted. The two PCBs 12 are respectively slidably-mounted within a right-side slot 13 and a left-side slot 14 that are formed on the two sloped outer surfaces of U-shaped channel 21. In FIG. 1, left-side slot 14 is shown empty and ready to receive a PCB 12.

FIG. 1 also shows the end view of a metal DIN rail 15 on which electrical components and accessories (not shown) of virtually any type can be mounted. In addition, FIG. 1 shows the end view of the internal wire-cavity 16 that is adapted to contain electrical wiring that extends to and from the components that are mounted on DIN rail 15.

Wire-cavity 16 is defined by (1) the flat, rectangular, and plastic cover 20, and (2) the generally U-shaped plastic channel member 21 that has a flat top surface 22, two inclined side walls 23 and 24 that extend downward at an angle of about 45-degrees from top surface 22, and two perpendicular side walls 25 and 26 that extend downward from inclined side walls 23 and 24, generally perpendicular to top surface 22.

The plastic material that is used to form cover 20 and U-shaped channel 21 is not critical to the invention. Basically all that is required is that the plastic provide a relatively rigid cover 20 and U-shaped channel 21, and that the plastic be an electrical insulator.

In a non-limiting embodiment of the invention dimension 27 of FIG. 1 was about 157 millimeters (mm), dimension 28 was about 147 mm, dimension 29 was about 102 mm, and dimension 30 was about 42 mm.

Figure 2:
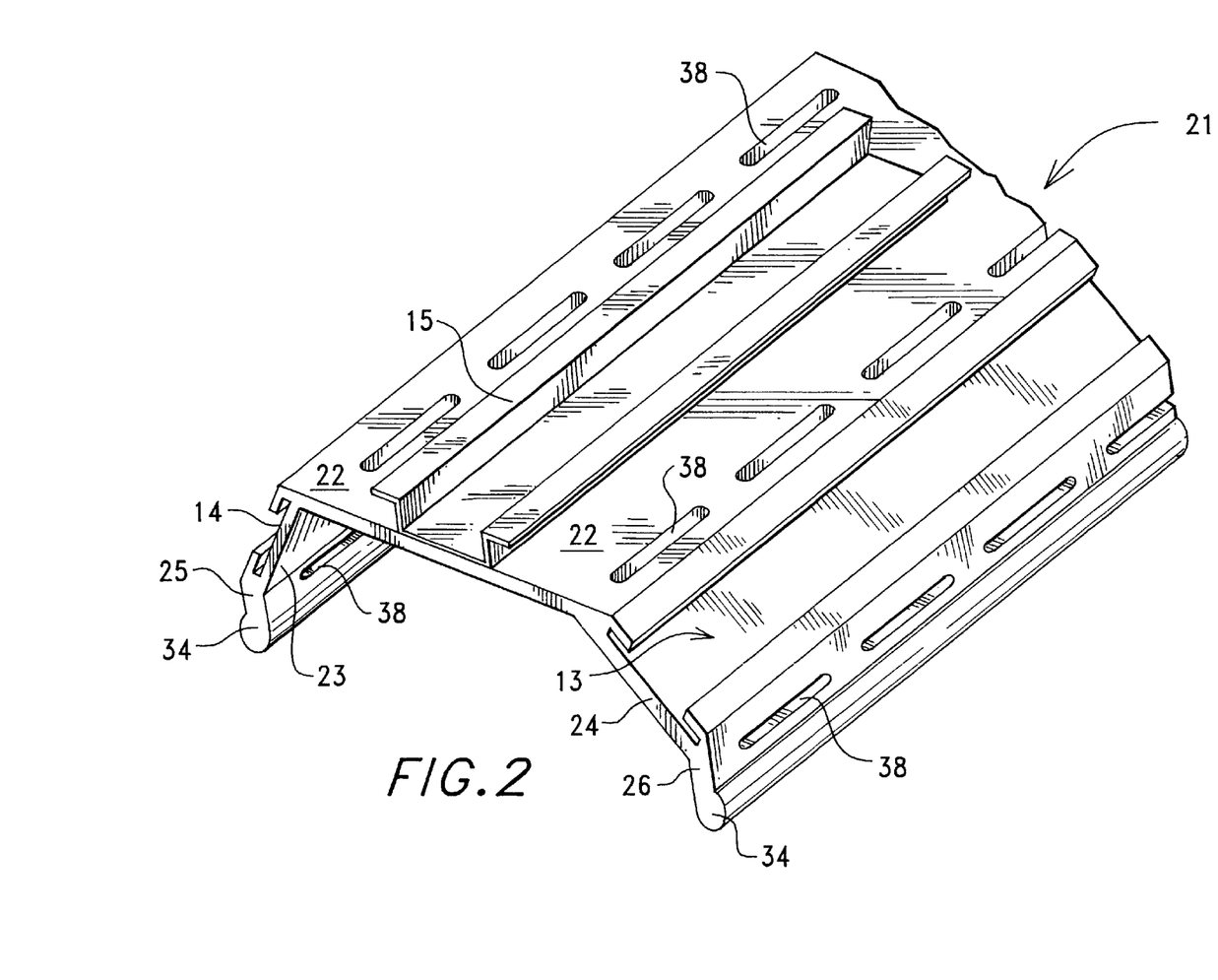
FIG. 2 is a top, right side, and end perspective view of the wiring track of FIG. 1 minus the plastic cover that is shown in FIG. 1 and minus the printed circuit board that is shown in FIG. 1, this view better showing the DIN rail that is mounted on the top exposed surface of the wiring track's U-shaped channel member, and this view better showing a plurality of elongated through-slots that are provided in the U-shaped channel member, these slots facilitating the selective threading of wires that are to be connected to and from the electrical components that are mounted on the DIN rail.

FIG. 2 is a top, right side, and end perspective view of U-shaped channel 21. This figure better shows DIN rail 15 and the top exposed surface 22 of U-shaped channel 21. Also seen in this figure are a plurality of elongated through-slots or holes 38 that are provided in top surface 22 and in the two inclined side walls 23 and 24 of U-shaped channel 21. Slots 38 facilitate the selective threading of wires (not shown) that are to be connected to and from the DIN-rail-compatible components that are mounted on DIN rail 15.

Figure 3:
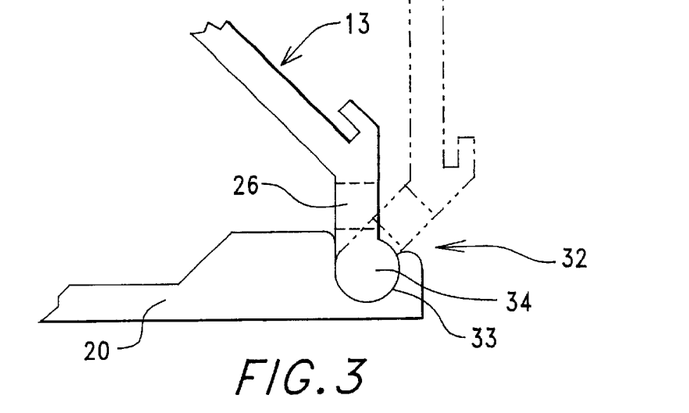
FIG. 3 is an enlarged section view of a right-side portion of the wiring track of FIG. 1 wherein the wiring track's U-shaped channel member has been pivoted away from the cover, utilizing one of the two snap-in hinges that reside respectively on the two mating edges of the U-shaped channel member and the cover.

With reference to FIGS. 1, 2 and 3, U-shaped channel 21 is releasably, and pivotally, mounted onto cover 20 by the operation of the two snap-in hinges 31 and 32. More specifically, each of the two opposite edges 35 and 36 of cover 20 carries a female hinge member 33, and each of the two perpendicular side walls 25 and 26 of U-shaped channel 21 carries a male hinge member 34.

In operation, cover 20 is first mounted onto a generally flat surface (not shown) such that the cover's external surface 37 abuts the flat surface. U-shaped channel 21 is then mounted onto cover 21 by pressing the two male hinge members 34 into the two female hinge members 33.

FIG. 3 is an enlarged section view of a portion of the right-side of wiring track 10 wherein the wiring track's U-shaped channel 21 has been released from the left edge 35 of cover 20, and then pivoted away from cover 20, utilizing the snap-in hinge 32 that resides at the left edge of U-shaped channel 21 and cover 20. In this position of U-shaped channel 21, access is provided to the internal cavity 16 that is shown in FIG. 1.

More generally, cover 20 and U-shaped channel 21 are edge-coupled to thereby provide an elongated cavity 16 through which wires can be treaded. While double-pivotal-coupling of U-shaped channel 21 to cover 20 is preferred (as shown), it is within the spirit and scope of the invention to provide a pivot at only one edge of U-shaped channel 21 and cover 20, and it is within the spirit and scope of the invention to provide a releasable-coupling between U-shaped channel 21 and cover 20 that does not provide for such a pivoting feature. Most importantly, the coupling between U-shaped channel 21 and cover 20 is such that U-shaped channel 21 is releasable from cover 20 in order to provide access to cavity 16.

In addition, while cover 20 is shown as being a generally flat cover, it is within the spirit and scope of the invention to provide a cover 20 having a different shape. For example, a cover 20 that is generally U-shaped in cross section will provide a cavity 16 having a larger cross sectional area, and such a cover 20 is within the spirit and scope of the invention.

Figure 4:
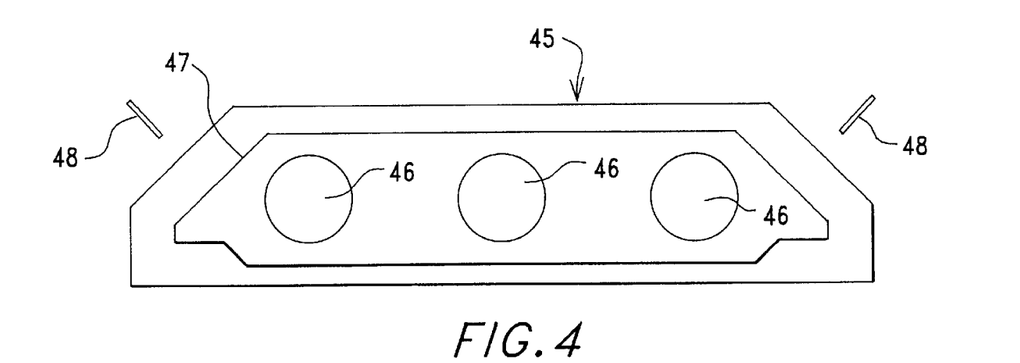
FIG. 4 is a plan view that shows an end-cap that may be used to close one or both ends of the wiring track's internal cavity, this end-cap having three through-holes for the passage of wire into or out of the wiring track's internal cavity.

As will be appreciated, the two opposite ends of wiring track 10, one end of which is shown in FIG. 1, are open. FIG. 4 shows a plastic end-cap 45 that may be used to close one or both ends of the wiring track's internal cavity 16. Desirably, end-cap 45 includes three ¾ inch diameter through-holes 46 for the passage of wires into or out of the wiring track's internal cavity 16.

Figure 5:
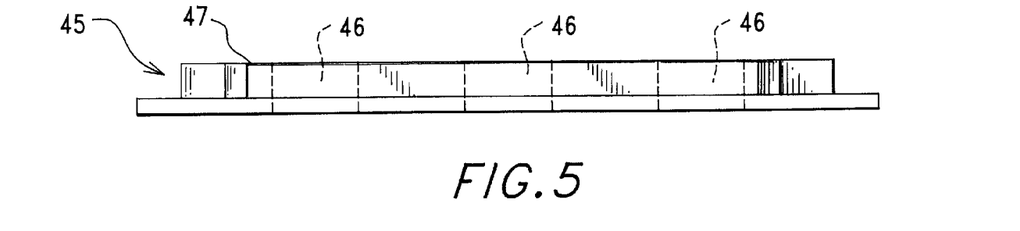
FIG. 5 is a top view of the FIG. 4 end-cap.

FIG. 5 is a top view of end cap 45, this figure better showing that each end cap 45 includes a raised portion 47 that enters internal cavity 16, such that each end cap can be secured to U-shaped channel 21 by the operation of pins 48 that penetrate U-shaped channel 21 and the raised portion 47 of each end cap 45.

Figures 6, 7, 8, 9:
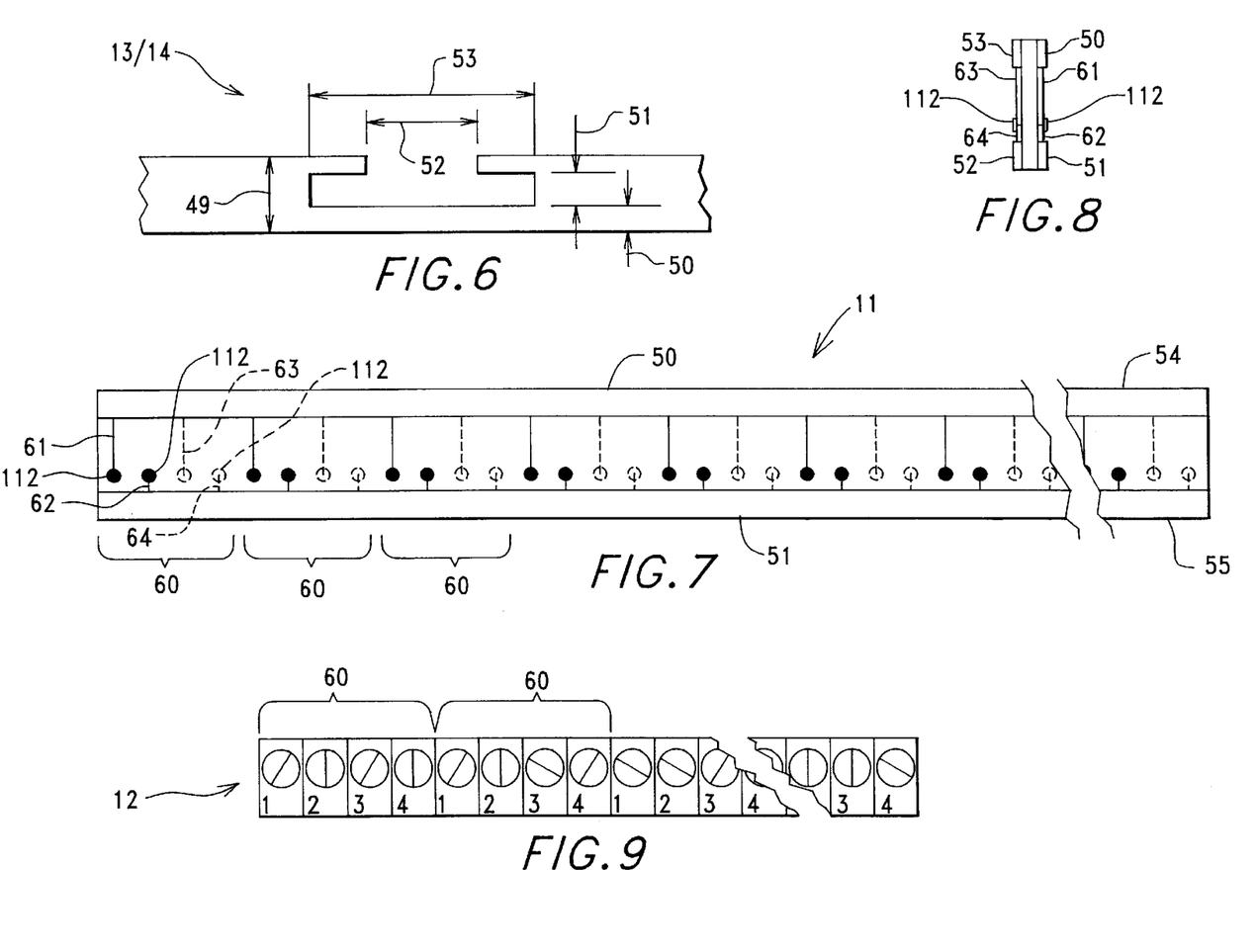
FIG. 6 is an enlarged view that shows one of the two elongated slots that are carried by the outer angled surfaces of the FIG. 1 wiring track, this slot being adapted to slidably receive a printed circuit board as shown in FIG. 1.
FIG. 7 is a top section view of a portion of a printed circuit board that is carried in each of the two elongated exterior-surface slots shown in FIGS. 1 and 6, this figure also showing the various printed circuit metal paths that selectively connect alternate ones of the printed circuit board's screw-terminals to alternate ones of the four metal printed circuit busses that are carried by that printed circuit board.
FIG. 8 is a sectioned end view of the FIG. 6 printed circuit board, this figure better showing the four printed-circuit metal busses that are located on the printed circuit board.
FIG. 9 is a sectioned top view of the plurality of screw-terminals that are carried along the center of the printed circuit board of FIG. 7.

FIG. 6 is an enlarged view that shows one of the two generally identical elongated slots 13 and 14 that are carried by the two outer 45-degree angled surfaces of wiring track 10.

In a non-limiting embodiment of the invention dimension 49 of FIG. 6 was about 10 mm, dimension 50 was about 3 mm, dimension 51 was about 4 mm, dimension 52 was about 15 mm, and dimension 53 was about 30 mm.

FIG. 7 is a top section view of a portion of one of the two PCBs 11 that are respectively carried by the two elongated exterior-surface slots 13 and 14 that are perhaps best seen in FIGS. 1, 2 and 6.

With reference to FIGS. 7 and 8, each of the two PCBs 11 carries four generally parallel metal printed circuit busses 51–53 on the opposite edges 54 and 55 of each PCB and on opposite surfaces of each PCB.

More specifically, the upper-surface metal bus 50 and the lower surface bus 53 reside on the edge 54 of each PCB 11, and the upper surface metal bus 51 and the lower surface bus 52 reside on the edge 55 of each PCB 11.

FIG. 9 is a sectioned top view of the plurality of screw-terminals or connectors 12 that are carried along the longitudinal center of each of the two PCBs 11. In FIG. 7 these screw-terminals 12 are represented by circles 112.

Terminals 12/112 are grouped together with each group of terminals comprising four adjacent terminals 12/112. For example, in FIGS. 7 and 9 a first and a second terminal-group 60 are shown as each having four terminals 12/112.

As best seen in FIG. 7, (1) a top-PCB-surface metal printed circuit line 61 connects the first terminal of each terminal-group 60 to upper-surface bus 50, (2) a top-PCB-surface metal printed circuit line 62 connects the second terminal of each terminal-group 60 to upper-surface bus 51, (3) a bottom-PCB-surface metal printed circuit line 63 connects the third terminal of each terminal-group 60 to bottom-surface bus 53, and (4) a bottom PCB-surface metal printed circuit line 64 connects the fourth terminal of each terminal-group 60 to bottom-surface bus 52.

In a like manner, each succeeding four terminals 12/112 are connected to the four busses 50–53.

Note that the first-terminal 12/112 of each terminal group 60 is connected to the same bus 50. Thus, for example, bus 50 can be designated a ground potential bus, and all wires that are to be connected to ground potential can then connected to one of the first-terminals.

In a like manner, each second-terminal of each terminal group 60 are bus-51-interconnected, the third-terminal of each terminal-group 60 are bus 53-interconnected, and the fourth-terminal of each terminal-group 60 are bus-52-interconnected.

Since the above-described first, second, third and fourth terminals of each terminal group 60 comprise four individual electrical connections, each of the first, second, third and fourth terminals of each terminal group 60 can carry a unique identifier. For example, in FIG. 9 each the first-terminal of each terminal group 60 is marked "1", the second-terminal of each terminal group 60 is marked "2", the third-terminal of each terminal group 60 is marked "3", and the fourth-terminal of each terminal group 60 is marked "4". Other visual markings can be used, for example the use of four different colors.

As will be appreciated, within the spirit and scope of the invention more than two PCBs can be provided on wiring track 10, each PCB can include more than four busses, and the terminals that are carried by the PCB can be divided into terminal-groups in accordance with the number of busses that are provided on each PCB.

More generically, (1) each of the wiring track's plural PCBs includes the number N of busses, (2) each PCB includes a plurality of metal connectors, (3) the metal connectors are divided into a plurality of terminal-groups wherein each terminal group contains the number N of individual metal connectors, and (4) each of the N individual metal connectors within each terminal-group is connected to a different one of the number N of busses.

While a preferred embodiment of the invention provides that the above-described busses and terminals are carried by PCBs, it is within the spirit and scope of this invention to provide a construction and arrangement whereby the above-described busses and terminals are formed on, and integrally carried by, plastic U-shaped channel 21.

The invention has been described in detail while making reference to various embodiments thereof. However it is appreciated that those skilled in the art will, upon learning of the invention, readily visualize yet other embodiments that are within the spirit and scope of the invention. Thus, the above detailed description is not to be taken as a limitation on the spirit and scope of the invention.

While the invention has been particularly shown and described with reference to a preferred embodiment thereof, it will be understood by those skilled in the art that various other changes in the form and details may be made without departing from the spirit and scope of the invention.

What is claimed is:

1. A wiring track, comprising:
   an elongated and generally rectangular cover having two generally parallel edges;
   a first hinge member carried by each of said two parallel edges of said cover;
   a generally U-shaped and elongated channel having a generally flat and rectangular outer surface, and having two side walls that extend in a common direction away from said generally flat outer surface;
   each of said side walls having an edge that carries a second hinge member adapted to mate with a said first hinge member when said generally U-shaped channel is pivotally mounted onto said cover to form an elongated and internal wire-cavity;
   an elongated mounting rail mounted on said outer surface of said generally U-shaped channel;
   said mounting rail adapted for the mounting of electrical components on said mounting rail;
   a terminal strip mounted on an exterior surface of at least one of said side walls;
   the number N of metal busses mounted on said terminal strip;
   a plurality of terminal-groups mounted on said terminal strip;
   each terminal-group having the number N of electrical connectors individually connected to different ones of said number N of metal busses; and
   a plurality of wire-openings formed in said U-shaped channel.

2. The wiring track of claim 1 wherein said first and second hinge members comprise snap-together hinge members.

3. The wiring track of claim 2 wherein said cover and said generally U-shaped channel are formed of an electrically insulating material.

4. The wiring track of claim 3 wherein said generally U-shaped channel is releasable from one edge of said cover as said generally U-shaped channel is pivoted away from said cover to facilitate access to said internal wire-cavity.

5. The wiring track of claim 4 including:
   a pair of end plates mating with said cover and said generally U-shaped channel and closing opposite ends of said internal wire-cavity, at least one of said end plates including at least one wire-opening.

6. The wiring track of claim 1 wherein said mounting rail is a DIN rail.

7. The wiring track of claim 6 wherein said DIN rail provides a ground connection for components mounted on said DIN rail.

8. The wiring track of claim 7 wherein said first and second hinge members comprise male/female snap-in/snap-out hinge members.

9. The wiring track of claim 8 wherein said cover and said generally U-shaped channel are formed of an electrically insulating plastic.

10. The wiring track of claim 9 wherein said plastic cover and said plastic U-shaped channel are cut to a common length.

11. The wiring track of claim 10 wherein said plastic cover is adapted to be mounted on a surface, and wherein said generally U-shaped plastic channel is adapted to be released from only one edge of said cover as said generally U-shaped channel is pivoted away from said cover to facilitate access to said internal wire-cavity.

12. The wiring track of claim 11 including:
   a pair of plastic end plates mating with said plastic cover and said generally U-shaped plastic channel and closing opposite ends of said internal wire-cavity;
   at least one wire-opening in at least one of said pair of end plates, and means securing said pair of end plates to said generally U-shaped plastic channel.

13. A method of providing a wiring track that facilitates the mounting of electrical components thereon, and that facilitates the routing of wires to and from said electrical components, comprising the steps of:
   providing an elongated and generally rectangular cover having two generally parallel edges;
   providing a first hinge member on each of said two parallel edges of said cover;
   providing a generally U-shaped and elongated channel having a generally flat and rectangular outer surface, and having two side walls that extend in a common direction away from said generally flat outer surface;
   providing that each of said side walls includes an edge carrying a second hinge member adapted to mate with a said first hinge member when said generally U-shaped channel is pivotally mounted onto said cover to form an elongated and internal wire-cavity;
   providing an elongated electrical component mounting rail on said outer surface of said generally U-shaped channel;
   providing a terminal strip on an exterior surface of at least one of said side walls;
   providing the number N of metal busses on said terminal strip;
   providing a plurality of terminal-groups on said terminal strip;
   providing that each terminal-group includes the number N of electrical connectors individually connected to different ones of said number N of metal busses; and
   providing a plurality of wire-openings in said U-shaped channel.

14. The method of claim 13 wherein said first and second hinge members are snap-together hinge members.

15. The method of claim 14 including the step of:
   forming said cover and said generally U-shaped channel of an electrically insulating material.

16. The method of claim 15 wherein said generally U-shaped channel is releasable from at least one edge of said cover as said generally U-shaped channel is pivoted away from said cover to facilitate access to said internal wire-cavity.

17. The method of claim 16 including the steps of:
   providing a pair of end plates that close opposite ends of said internal wire-cavity; and
   providing at least one wire opening in at least one of said end plates.

18. The method of claim 13 wherein said mounting rail is a DIN rail.

19. The method of claim 18 wherein said first and second hinge members comprise male/female snap-in/snap-out hinge members.

20. The method of claim 19 including the step of:
   forming said cover and said generally U-shaped channel from an electrically insulating plastic.

21. The method of claim 20 including the step of:
   cutting said plastic cover and said plastic U-shaped channel to a common length.

22. The method of claim 21 wherein said plastic cover is adapted to be mounted on a surface, and wherein said generally U-shaped plastic channel is adapted to be released from an edge of said cover, as said generally U-shaped channel is pivoted away from said cover to facilitate access to said internal wire-cavity.

23. The method of claim 22 including the steps of:
   providing a pair of plastic end plates;
   utilizing said pair of plastic end caps to close opposite ends of said internal wire-cavity;
   providing at least one wire-opening in at least one of said pair of end plates, and
   securing said pair of end plates to said generally U-shaped plastic channel.

24. An elongated wiring track, comprising:
   an elongated and generally rectangular plastic cover having two generally parallel edges;
   a female hinge member carried by each of said two parallel edges of said cover;
   a generally U-shaped and elongated plastic channel having a generally flat and rectangular outer surface, having two inclined side walls that extend in a common direction and at about 45-degrees away from said generally flat outer surface, and having two perpendicular side walls that extend in a common direction away from said inclined side walls and perpendicular to said outer surface;
   each of said perpendicular side walls having an edge that carries a male hinge member for releasably mating with a said female hinge member when ad generally U-shaped channel is pivotally mounted onto said cover to form an elongated and internal wire-cavity;
   an elongated DIN rail mounted on said outer surface of said generally U-shaped channel;
   a terminal strip mounted on an exterior surface of each of said inclined side walls;
   the number N of metal busses mounted on each of said terminal strips;
   a plurality of terminal-groups mounted on each of said terminal strips;
   each terminal-group having the number N of electrical connectors individually connected to different ones of said number N of metal busses;
   a plurality of wire-openings formed in said U-shaped channel; and
   a plurality of wire-openings formed in said generally flat outer surface of said U-shaped channel.

25. The wiring track of claim 24 including:
   a pair of plastic end plates closing opposite ends of said internal wire-cavity, at least one of said end plates including at least one wire-opening.

26. The wiring track of claim 25 wherein said plastic cover and said plastic U-shaped channel are cut to a common desired length.

27. A wiring track, comprising:

an elongated plastic cover member having two edges;

an elongated plastic channel-shaped member having a generally flat outer surface, and having two side walls that extend in a common direction away from said generally flat outer surface, each of said side walls having an edge adapted to be secured to an edge of said cover member, to thereby form an elongated wire-cavity between said cover member and said channel-shaped member;

an elongated mounting rail mounted on said outer surface of said channel-shaped member, said mounting rail adapted for the mounting of electrical components thereon;

a plurality N of elongated metal busses on an exterior surface of at least one of said side walls;

a plurality of terminal-groups mounted on an exterior surface of at least one of said side walls, each terminal-group having the number N of metal electrical connectors that are individually electrically connected to a different one of said number N of metal busses; and a plurality of wire-openings formed along a length of said wiring track to facilitate the passage of wires between said wire-cavity and said electrical connectors.

28. The wiring track of claim 27 wherein said channel-shaped member is releasable from said cover member, to facilitate movement of said channel-shaped member away from said cover member, to thereby facilitate access to said wire-cavity.

29. The wiring track of claim 27 including:

a pair of end plates mating with said cover member and said channel-shaped member, and operating to close opposite ends of said wire-cavity, at least one of said end plates including at least one wire-opening.

30. The wiring track of claim 27 wherein said mounting rail is a DIN rail.

31. The wiring track of claim 30 wherein said channel-shaped member is releasable from said cover member to facilitate access to said wire-cavity, and including:

a pair of end plates mating with said cover member and said channel-shaped member to close opposite ends of said wire-cavity, at least one of said end plates including at least one wire-opening.

* * * * *